Oct. 21, 1930.   W. PEYINGHAUS   1,778,961

ARMORING OF BRASSES OR STEPS FOR BEARINGS

Filed Nov. 30, 1928

Inventor
Walter Peyinghaus
By Pennie Davis Marvin + Edmonds
attorneys

Patented Oct. 21, 1930

1,778,961

UNITED STATES PATENT OFFICE

WALTER PEYINGHAUS, OF EGGE, GERMANY

ARMORING OF BRASSES OR STEPS FOR BEARINGS

Application filed November 30, 1928, Serial No. 322,944, and in Germany June 18, 1928.

This invention relates to the armoring of brasses or steps for bearings.

The attempts which have been made to cast iron or steel jackets upon the outer surfaces of brasses or steps for bearings have to a large extent been unsuccessful owing to the fact that the metal or alloy of which the brasses or steps are formed, for instance gunmetal or bronze, has a lower melting point than iron or steel and there was a tendency for the molten iron or steel as it flowed into the mould containing the brass or step to be jacketed, to melt the thinner portions of such brass or step. This tendency was most pronounced in the region of the point at which the molten iron or steel entered the mould cavity and the result in many cases was that the steel jacket was traversed by veins of gunmetal or bronze and was consequently unsuitable for use in bearings where in cases of emergency the jacket of the bearing should be able to carry the load. These unsuccessful results occurred especially in cases where the brasses were placed in an upright or end-on position in the mould, but even in cases where the brasses were placed horizontally in the mould with their backs facing upwards the comparatively thin downwardly extending legs of the brasses were sometimes melted owing to the fact that they came first in contact with the molten steel. Moreover, the backs of the brasses did not readily weld or become united with the steel. Even in cases where the brasses were suspended in the mould with their backs facing downwardly, a uniform surface weld or burning-on could not be obtained. Either the backs of the brasses were melted or the upwardly extending legs of the brass could not be caused to weld or become united with the steel owing, probably, to the fact that the molten steel before reaching these upper parts had to traverse a long and devious casting gutter or channel which entered the mould cavity at the bottom and to the tendency of the upper ends of the steel jackets to diverge away from the walls of the brass.

The object of the present invention is to overcome these difficulties and to enable a uniform and intimate welding or burning-on of the jacket or armoring.

According to the invention the molten steel or other metal of which the jacket is to be formed is led into the top of the mold cavity through a multiple casting gutter or spider each leg of which is of comparatively large cross section so that the bottom of the mould is reached by the shortest possible way and the mould cavity itself is filled so quickly that the brass is encompassed or embraced by the molten metal on the whole of its outer surface almost simultaneously and uniformly. The brasses are supported or suspended in the moulds with their backs facing downwardly and the legs of the multiple casting gutter or spider are preferably arranged in pairs so as to form a plurality of semi-circular or arch-shaped channels for leading the molten metal into the mould cavity. When the metal cools the outer curved surface of the brass has welded or burnt thereon a continuous jacket or half shell which is completed at various points along its length by a plurality of upwardly extending semi-circular or arch-shaped bands of metal which with the jacket form a series of complete rings. In other words the metal in the multiple casting gutter or spider and that forming the jacket together form a hollow cylinder or prism, the lower portion of which embraces the brass and is continuous and the upper portion of which is mutilated so that it has the appearance of a series of half-hoops which are joined to one another at their highest points and merge into the jacket at their lower ends.

In order that the said invention may be clearly understood and readily carried into effect, the same will be more fully described with reference to the accompanying drawings, in which:—

Figure 1:
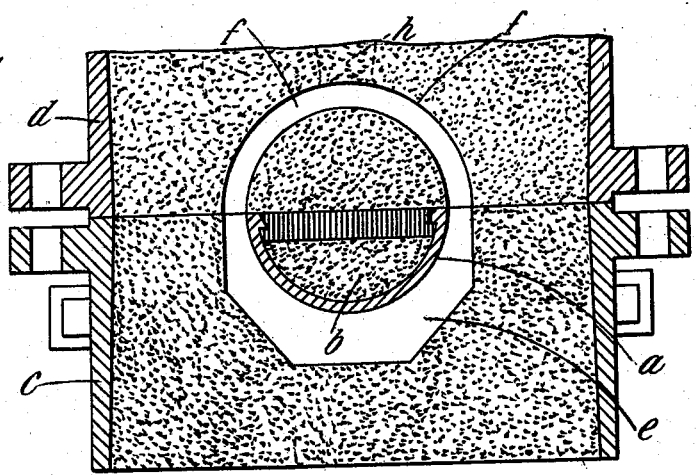
Figure 1 is a sectional elevation of a mould containing a brass ready to have a jacket welded or burnt on its outer surface.
Figure 2:
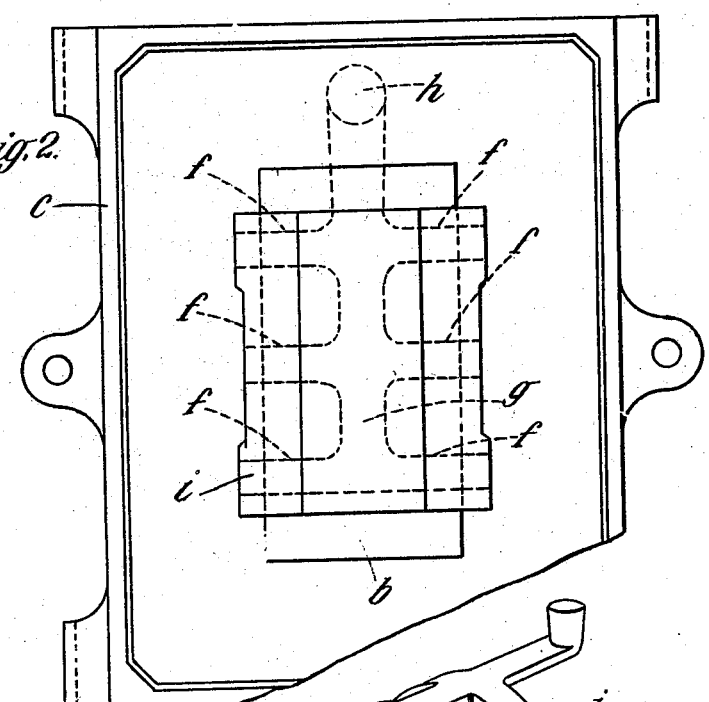
Figure 2 is an inverted plan view of the casting in the mould when the sand is removed from the lower mould box.
Figure 3:
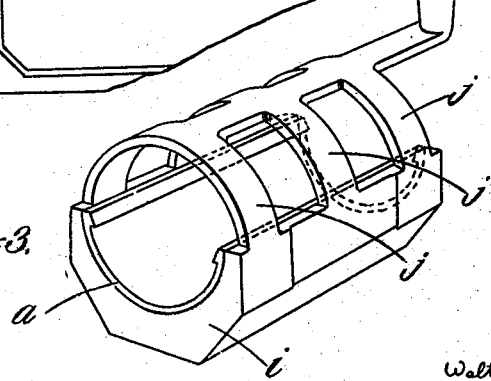
Figure 3 is a perspective view of the casting when removed from the mould.

$a$ is the brass or half-bush to be armored and $b$ is the core in which the brass is embedded. The mould is a two part one, the cavity for the armoring being formed in the lower part $c$ and the channels which constitute the multiple casting gutter or spider being formed in the upper part $d$. The brass or half-bush to be armored is embedded in the core $b$ so that the brass forms the outer surface of the core and the latter is supported at its ends so that the brass is suspended with its back facing downwardly in the cavity formed in the lower part of the mould and a space $e$ is left between the outer surface of the core and the walls of the cavity formed in the lower part of the mould. In the arrangement illustrated the multiple casting gutter or spider comprises six channels $f$ which are formed in the upper part of the mould for leading the molten metal of which the armoring is to be formed, for instance, iron or steel, into the space $e$. The channels are of quadrantal formation and extend outwardly and downwardly in pairs from a central feeding channel $g$ which communicates at one end with a header $h$ to enable the mould to be filled from the top. The said channels are of comparatively large cross section so as to enable the mould to be filled so quickly that the brass is almost simultaneously encompassed by molten metal. As may be seen from Figure 3 the resulting casting comprises an armoring jacket $i$ which is welded or burnt on the outer surface of the brass $a$ and which is completed at various points along its length by a series of semi-circular bands of metal $j$. These bands form with the armoring complete rings which during the solidification of the metal exert a contracting influence upon the brass and produce a welding pressure. Thus by casting the armoring around the bass in such a manner that the armoring is surmounted by a casting of hollow semi-cylindrical formation formed integral with the armoring the usual tendency for the upper parts of the armor to diverge away from the brass is overcome and in place thereof the shrinking forces set up during solidification of the ring-like casting are utilized to secure an intimate welding or burning on of the armor.

What I claim and desire to secure by Letters Patent of the United States is:—

1. A new article of manufacture comprising an armored brass for bearings in which the brass is composed of a metal having a lower melting point than that of the metal of which the armoring is formed, said armoring comprising a jacket of cast metal and a multiple spider made up of a series of semi-circular members so that the metal of the multiple spider and that forming the jacket together form a hollow prism the lower portion of which embraces the brass and is continuous and the upper portion of which is mutilated so that it has the appearance of a series of half hoops which are joined to one another at their highest points and merge into the jacket at their lower ends.

2. A new article of manufacture comprising an armored brass for bearings having a ring-like shell cast around the brass so that the shrinking forces set up in the shell during solidification exert a welding pressure between the armoring and the brass, the said shell being composed of a lower part constituting the armoring proper and an upper part consisting of a series of semi-circular bands of metal the lower ends of which merge into the armoring at various points along its length.

WALTER PEYINGHAUS.